(12) United States Patent
Martinez (10) Patent No.: US 8,327,495 B1
(45) Date of Patent: Dec. 11, 2012

(54) WINDOW WIPER SYSTEM

(76) Inventor: Melchor Martinez, Miami, FL (US)

( * ) Notice: Subject to any disclaimer, the term of this patent is extended or adjusted under 35 U.S.C. 154(b) by 373 days.

(21) Appl. No.: 12/703,371

(22) Filed: Feb. 10, 2010

(51) Int. Cl.
*B60R 1/06* (2006.01)
(52) U.S. Cl. .................... 15/250.003; 15/250.1
(58) Field of Classification Search ............. 15/250.003, 15/250.3, 250.1
See application file for complete search history.

(56) References Cited

U.S. PATENT DOCUMENTS

| | | | |
|---|---|---|---|
| 4,316,303 A | 2/1982 | Penn | |
| 5,150,497 A | 9/1992 | Preik | |
| D330,696 S | 11/1992 | Alain | |
| 6,324,718 B1 * | 12/2001 | Johnson | ............. 15/250.003 |
| 6,654,982 B1 * | 12/2003 | Cowan | ............. 15/250.003 |
| 7,069,617 B2 | 7/2006 | James | |
| 7,222,384 B1 | 5/2007 | Lin | |
| 7,322,069 B1 * | 1/2008 | Lin | .................. 15/250.3 |
| 7,540,060 B2 * | 6/2009 | Holmes | ............. 15/250.003 |
| 2001/0049853 A1 | 12/2001 | Johnson | |
| 2005/0110297 A1 * | 5/2005 | Seksaria et al. | ............. 296/146.1 |
| 2007/0234500 A1 * | 10/2007 | Holmes | ............. 15/250.003 |

* cited by examiner

*Primary Examiner* — Basil Katcheves (57) ABSTRACT

A window wiper system featuring a first wiper component for wiping a side door window and a side mirror component featuring a means of wiping its mirrored surface. The first wiper component features a first wiper arm and blade pivotally attached to the side door of and a first motor for oscillating the first wiper blade in a first and second direction across the window. The side mirror component features a base having a front panel with a mirrored surface, a pivot arm attached to a first gear on the front panel, a motor operatively connected to the first gear, and a second wiper blade pivotally attached to the pivot arm, when the pivot arm is pivoted in the first or second direction the second wiper blade is moved over the mirrored surface.

5 Claims, 6 Drawing Sheets

WINDOW WIPER SYSTEM

FIELD OF THE INVENTION

The present invention is directed to window/windshield wipers, more particularly to a wiper system for wiping side windows and side mirrors.

BACKGROUND OF THE INVENTION

During inclement weather, standard windshield wiper systems may not be sufficient. With respect to side windows and mirrors in particular, a drivers visibility can be severely impaired. The present invention features a wiper system for wiping side windows and side mirrors of a vehicle such as a truck (e.g., commercial truck). The wiper system can help clear rain, fog, debris, slush, and the like. The wiper system can help a driver maintain a full view when passing, changing lanes, merging, reversing, or the like.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY

The present invention features a window wiper system comprising a first wiper component for wiping a window of a side door of a vehicle and a side mirror component attachable to the side door of the vehicle via an attachment means. The first wiper component comprises a first wiper arm pivotally attached to the side door of the vehicle via pivot mechanism, wherein a first wiper blade is disposed on a second end of the first wiper arm, the first wiper blade is slidably in contact with the window; a first motor operatively connected to the first wiper arm, the first motor functions to cause the first wiper arm to oscillate in a first direction and a second direction about the pivot mechanism, whereby oscillation of the first wiper arm causes the first wiper blade to move back and forth across the window; a wiper fluid source comprising wiper fluid, the wiper fluid source is disposed in the side door, the wiper fluid source is fluidly connected to the first wiper blade via a wiper fluid tube, wherein the wiper fluid tube connects to an aperture disposed in the first wiper blade; and a fluid pump functioning to pump wiper fluid from the wiper fluid source through the wiper fluid tube to the aperture in the first wiper blade, the first wiper blade wipes the wiper fluid on the window.

The side mirror component comprises a base having a top end, a bottom end, a front panel with a mirrored surface, and an inner cavity; a first gear disposed on the front panel of the base, the first gear is positioned generally parallel to the front panel of the base, the first gear can rotate in a first direction and a second direction about an axle; a pivot arm attached to the first gear on the front panel of the base, wherein rotation of the first gear in the first direction translates to pivoting the pivot arm in a first direction and rotation of the first gear in the second direction translates to pivoting the pivot arm in a second direction; a second motor disposed in the inner cavity of the base, the second motor comprises a motor gear, the motor gear is operatively connected to the first gear, the second motor functions to cause the first gear to move in the first direction and the second direction; a second wiper blade pivotally attached to the pivot arm, wherein the second wiper blade is slidably in contact with the mirrored surface on the front panel of the base, wherein a first end of the second wiper blade is positioned near the top end of the base, and wherein a second end of the second wiper blade is positioned near the bottom end of the base; wherein when the pivot arm is pivoted in the first direction the second wiper blade is moved in a first direction over the mirrored surface and when the pivot arm is pivoted in the second direction the second wiper blade is moved in a second direction over the mirrored surface; a mirror wiper fluid source comprising wiper fluid, the mirror wiper fluid source is disposed in the inner cavity of the base, the mirror wiper fluid source is fluidly connected to the second wiper blade via a mirror wiper fluid tube, wherein the mirror wiper fluid tube connects to a mirror wiper fluid aperture disposed in the second wiper blade; and a mirror pump functioning to pump wiper fluid from the mirror wiper fluid source through the mirror wiper fluid tube to the second wiper blade, the second wiper blade wipes the wiper fluid on the mirrored surface.

In some embodiments, the first motor or the fluid pump is operatively connected to a power source. In some embodiments, the power source is an electrical system of the vehicle. In some embodiments, a convex mirror is disposed on the front panel of the base near the bottom end. In some embodiments, the pivot arm is a pair of pivot arms comprising a left arm and a right arm. In some embodiments, the right arm is attached to the first gear and the left arm is attached to a second gear, the second being attached to the front panel of the base near the first gear, the second motor is operatively connected to both the first gear and the second gear and functions to move both the first gear and the second gear in the first direction and the second direction. In some embodiments, the second wiper blade is pivotally attached to both the left arm and the right arm. In some embodiments, the pivot arm comprises a spring.

DESCRIPTION OF PREFERRED EMBODIMENTS

Referring now to FIGS. 1-6, the present invention features a window wiper system 100 for wiping side windows 102 and side mirrors of a vehicle such as a truck (e.g., commercial truck). The wiper system 100 can help clear rain, fog, debris, slush, and the like. The wiper system 100 can help a driver maintain a full view when passing, changing lanes, merging, reversing, or the like.

The window wiper system 100 comprises a first wiper component for wiping the window 102 of a side door 108 of the vehicle. The first wiper component comprises a first wiper arm 110 having a first end and a second end, and a first wiper blade 120 disposed on the second end of the first wiper arm 110. The first wiper component resembles standard windshield wipers, which are well known to one of ordinary skill in the art. The first wiper arm 110 is pivotally attached to the side door 108 of the vehicle via pivot mechanism 155. The first wiper blade 120 is slidably in contact with the window 102.

In some embodiments, the first wiper component can emit wiper fluid, for example via a wiper fluid tube 130 fluidly connecting a wiper fluid source 132 (e.g., in the side door 108) and the first wiper blade 120. In some embodiments, wiper fluid is pushed from the wiper fluid tube 130 through a wiper fluid tube aperture 135 disposed on the first wiper blade 120 so the wiper fluid contacts the window 102. Generally, a fluid pump 138 pumps the wiper fluid from the wiper fluid source 132 through the wiper fluid tube 130.

The first wiper arm is operatively connected to a first motor 150. The first motor 150 drives the first wiper arm 110 to rotate in a first direction and a second direction to move the first wiper blade 120 back and forth across the window 102. These motors and mechanisms of moving wiper components are well known to one of ordinary skill in the art.

The first motor 150 and/or the fluid pump 138 are operatively connected to a power source. In some embodiments, the power source is the electrical system of the vehicle. The first motor 150 and/or fluid pump 138 may be operatively connected to the power source via one or more wires 160.

The system 100 of the present invention further comprises a side mirror component that can be attached to the side door 108 of the vehicle, for example via an attachment means 109. The side mirror component comprises components that allow for wiping of the mirrored surface. The side mirror component comprises a base 600 having a top end, a bottom end, a front panel, and an inner cavity. A mirrored surface 104 is disposed on the front panel. In some embodiments, a convex mirror 104a is disposed on the front surface of the base 600, for example at or near the bottom end.

The side mirror component further comprises a second wiper blade 210 for wiping the mirrored surfaced 104 (and/convex mirror 104a) attached to the base 600 via a pivot arm 220 and a first gear 601. For example, a first gear 601 is disposed on the front panel of the base 600, either on the outer surface of the front panel or the inner surface in the inner cavity of the base 600. The first gear 601 is positioned generally parallel to the front panel of the base 600. The first gear 601 may be attached to the front panel of the base 600 via an axle, wherein the first gear 601 can rotate in a first direction and a second direction about the axle.

The pivot arm 220 is attached to the first gear 601. Rotation of the first gear 601 in the first direction translates to pivoting the pivot arm 220 in a first direction and rotation of the first gear 601 in the second direction translates to pivoting the pivot arm 220 in a second direction.

The side mirror component further comprises a second motor 250 disposed in the inner cavity of the base 600. The second motor 250 is operatively connected to the first gear 601. In some embodiments, the second motor 250 comprises a motor gear, wherein the motor gear is operatively connected to the first gear 601. The second motor 250 functions to cause the first gear 601 to move in the first direction and the second direction. Motors of this nature are well known to one of ordinary skill in the art.

The second wiper blade 210 is pivotally attached to the pivot arm 220. In some embodiments, the pivot arm 220 extends a certain distance over the mirrored surface 104. In some embodiments, the pivot arm 220 is pivotally attached to a center point of the second wiper blade 210 (e.g., around the middle of the wiper blade 210). The second wiper blade 210 is slidably in contact with the mirrored surface 104 (and 104a) on the front panel of the base 600. In some embodiments, a first end of the second wiper blade 210 is positioned near the top end of the base 600 and a second end of the second wiper blade 210 is positioned near the bottom end of the base 600. In some embodiments, when the pivot arm 220 is pivoted in the first direction the second wiper blade 210 is moved in a first direction over the mirrored surface 104 (and 104a), and when the pivot arm 220 is pivoted in the second direction the second wiper blade 210 is moved in a second direction over the mirrored surface 104 (and 104a) (see FIG. 4).

In some embodiments, a mirror wiper fluid source 260 comprising wiper fluid is disposed in the inner cavity of the base 600. The mirror wiper fluid source 600 is fluidly connected to the second wiper blade 210 via a mirror wiper fluid tube 263. The mirror wiper fluid tube 263 connects to a mirror wiper fluid aperture 268 disposed in the second wiper blade 210. A mirror pump 265 functions to pump wiper fluid from the mirror wiper fluid source 260 through the mirror wiper fluid tube 263 to the second wiper blade 210. The second wiper blade 210 wipes the wiper fluid on the mirrored surface 104, 104a.

In some embodiments, wiper fluid can be added to the wiper fluid source 260 via a mirror refill aperture 262. The refill aperture may be disposed in the top end of the base 600. The refill aperture 262 may be fluidly connected to the wiper fluid source 260 via a fill tube 450. In some embodiments, a drain hole 440 is disposed in the base 600, for example in the bottom end. The drain hole 440 can function to drain excess fluid that may collect in the inner cavity of the base 600 (e.g., if rain leaks in, if excess wiper fluid is added to the wiper fluid source 260, etc.).

Figure 1:
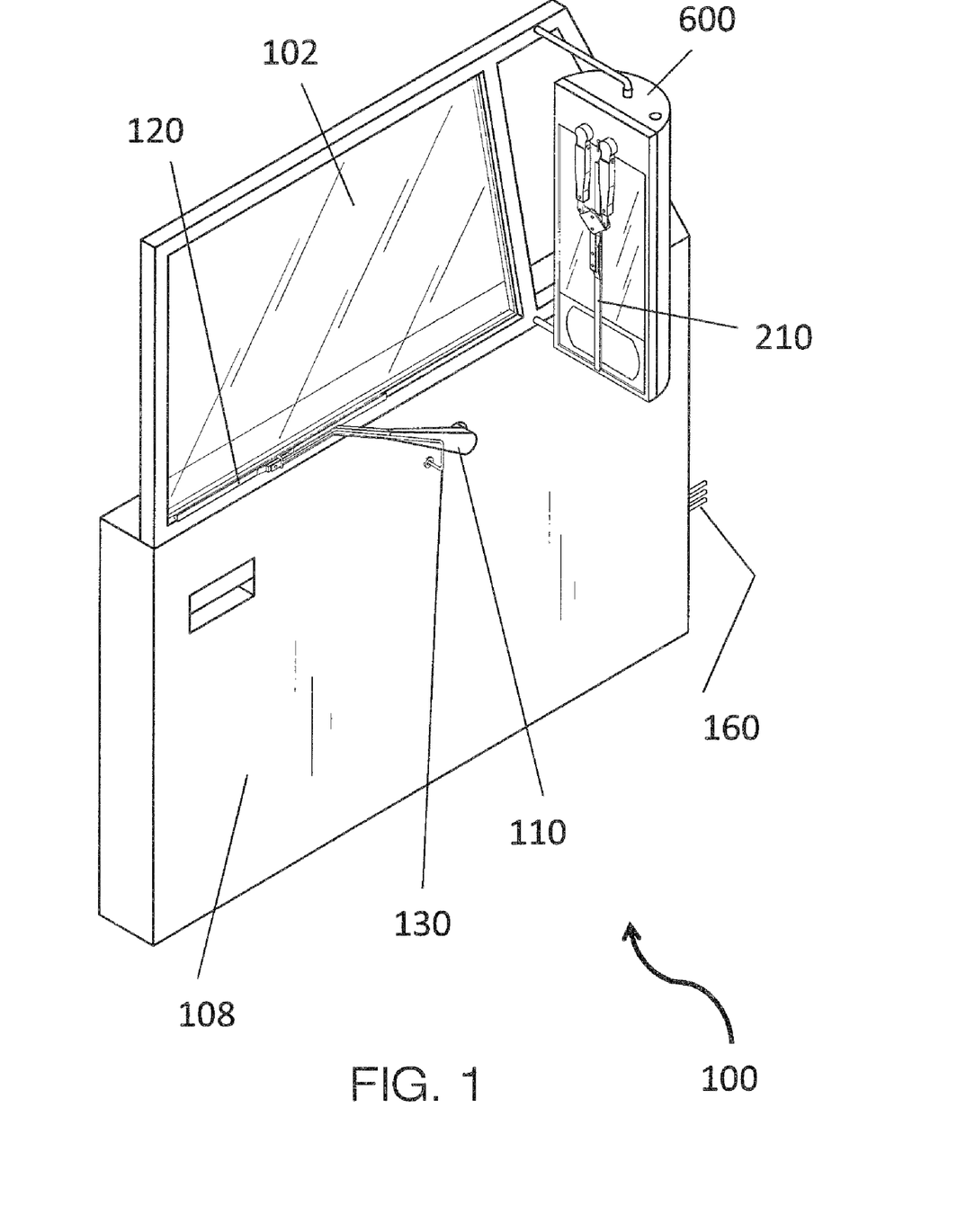
FIG. 1 is a perspective view of the wiper system of the present invention.
Figure 2:
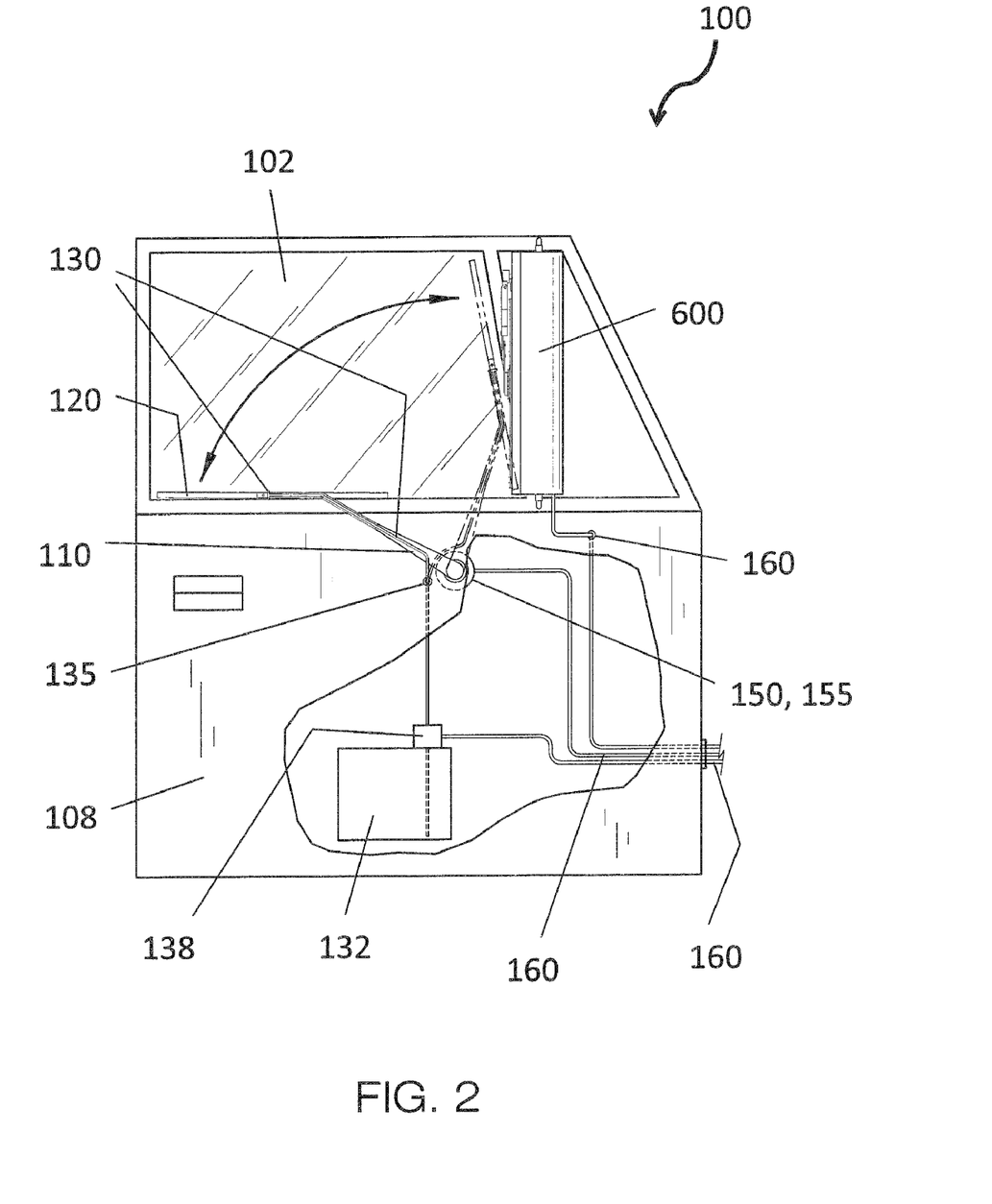
FIG. 2 is a side and internal view of the wiper system of FIG. 1.
Figure 3:
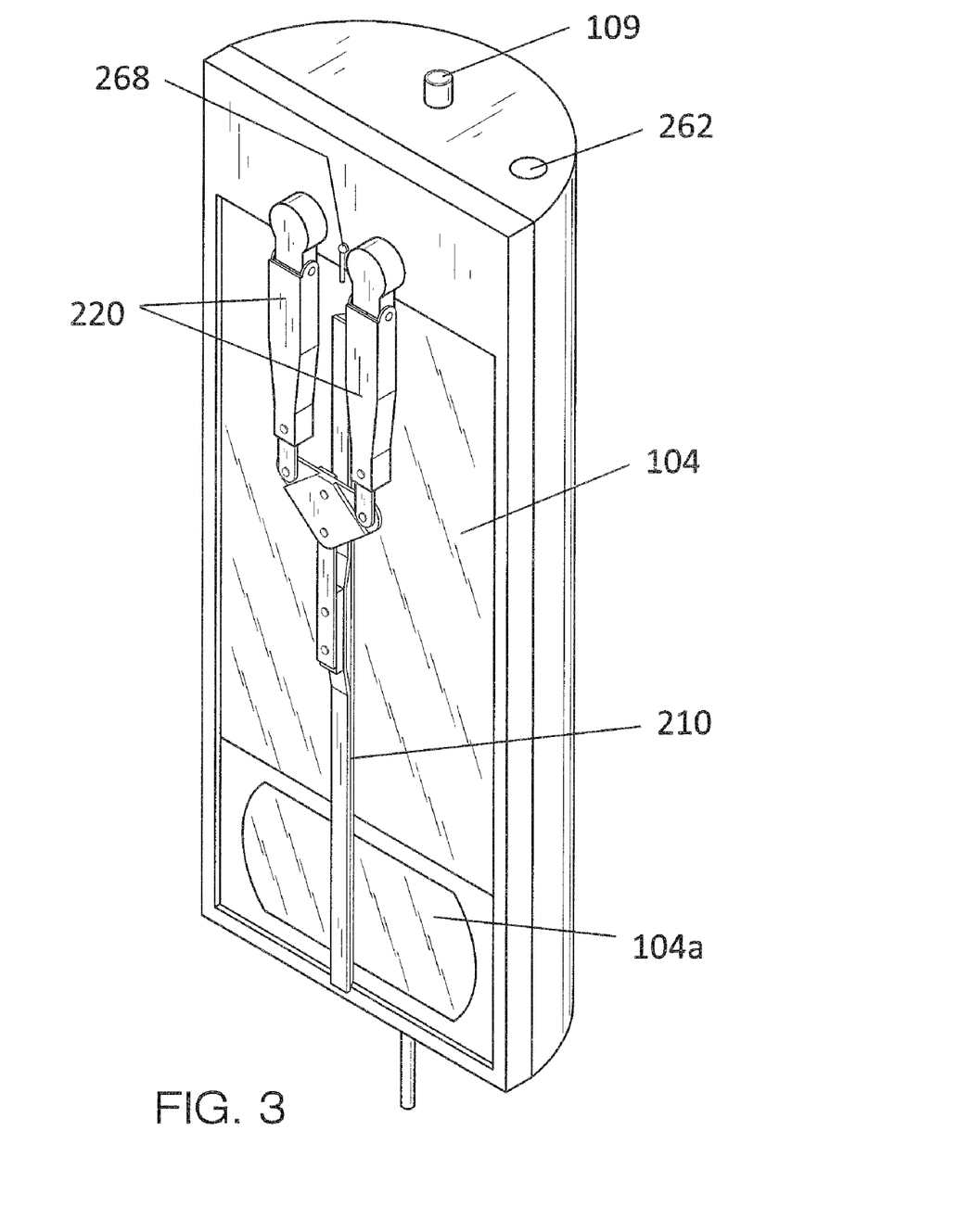
FIG. 3 is a perspective view of the wiper system of FIG. 1.
Figure 4:
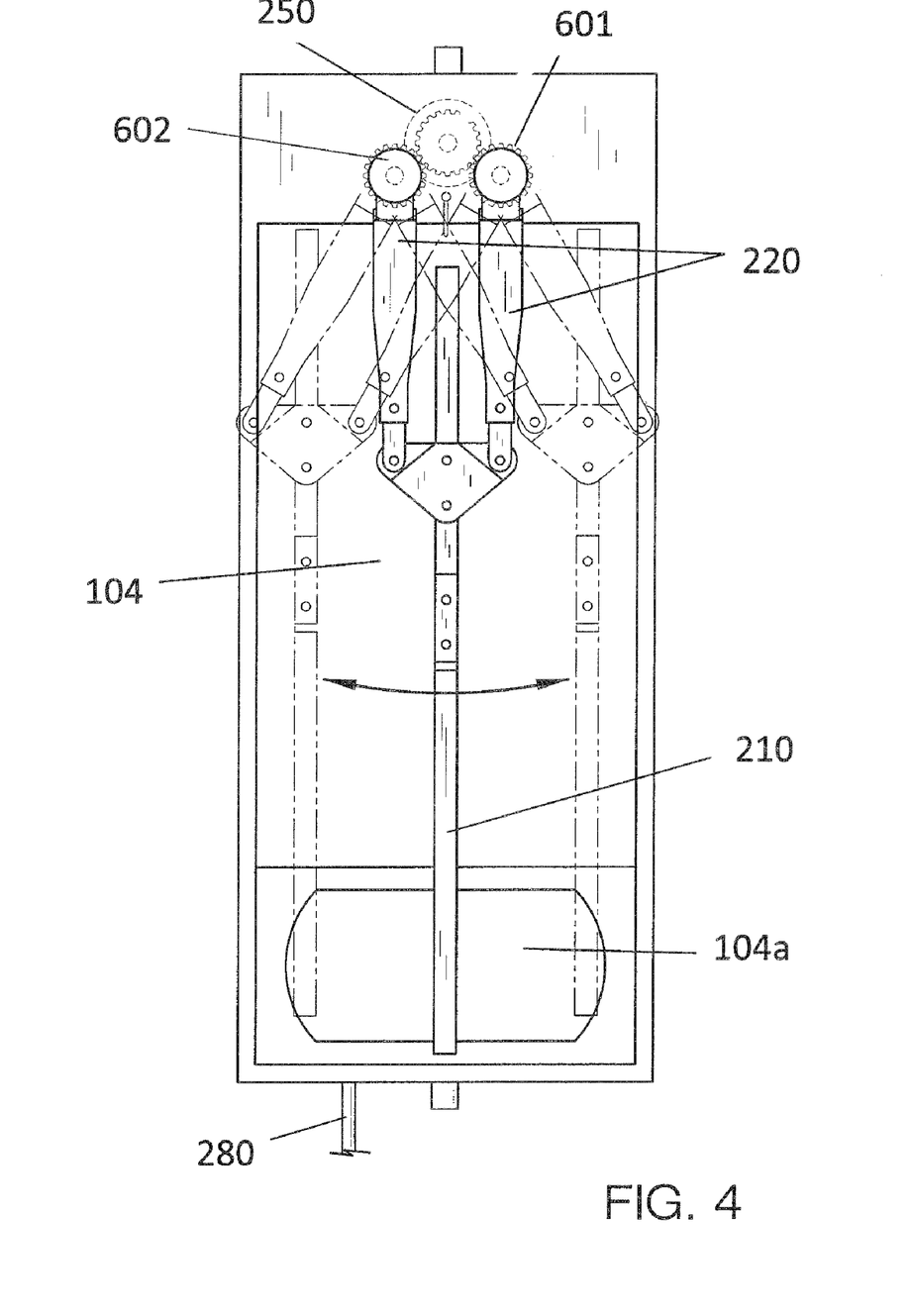
FIG. 4 is a front view of the wiper system of FIG. 1.
Figure 5:
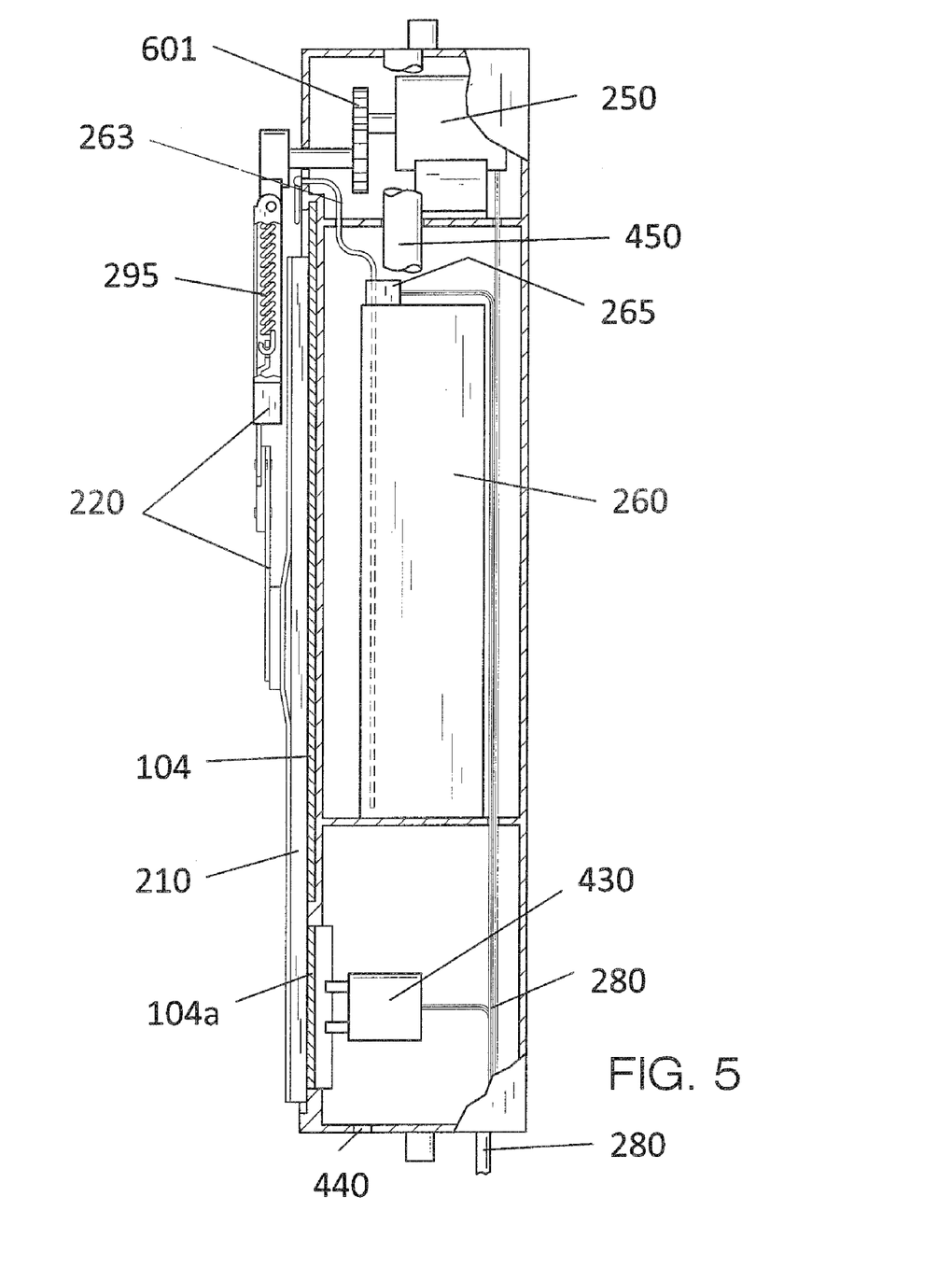
FIG. 5 is a side cross sectional view of the wiper system of FIG. 1.

In some embodiments, the pivot arm 220 is a pair of pivot arms (see FIG. 3, FIG. 4). The pair of pivot arms may comprise a left arm and a right arm, wherein the right arm is attached to the first gear 601 and the left arm is attached to a second gear 602. The second gear 602, like the first gear 601, is attached to the front panel of the base 600. The second motor 250 is operatively connected to the first gear 601 and the second gear 602, moving both the gears 601, 602 in the first direction and the second direction. The second wiper blade 210 may be pivotally attached to both the left arm and the right arm of the pair of pivot arms (see FIG. 4).

The second motor 250 and/or the mirror pump 265 are operatively connected to a power source. In some embodiments, the power source is the electrical system of the vehicle. The second motor 250 and/or mirror pump 265 may be operatively connected to the power source via one or more wires 280.

In some embodiments, the pivot arm 220 (or pair of pivot arms) comprises one or more springs 295. The springs 295 may provide flexibility of movement of the second wiper blade 210.

In some embodiments, the convex mirror 104a can be moved and manipulated, similar to how mirrors are commonly moved and manipulated. For example, the convex mirror may be manipulated via a convex mirror motor 430 disposed in the inner cavity of the base 600. Convex mirrors and motors and means of manipulating mirrors are well known to one of ordinary skill in the art.

Figure 6:
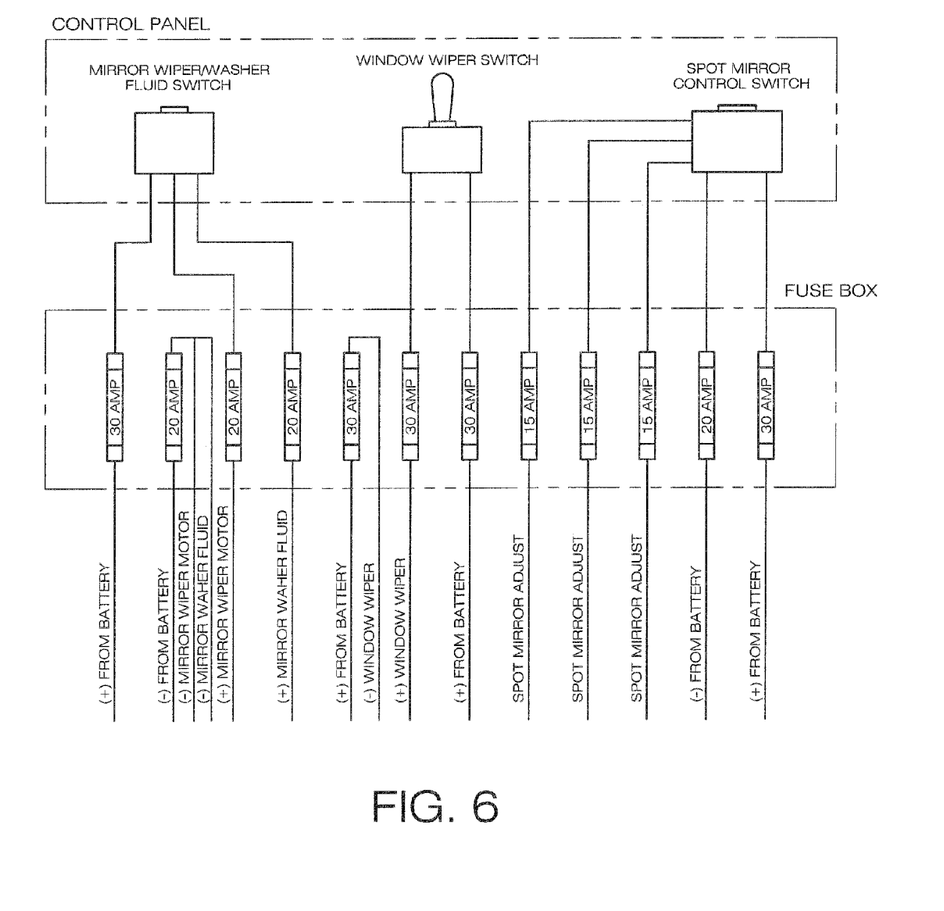
FIG. 6 is a schematic representation of the wiper system of the present invention.

Referring now to FIG. 6, in some embodiments, the system of the present invention comprises a control panel. The control panel (and its components) may be operatively connected to components of the fuse box of the vehicle. The control panel may comprise various switches for manipulating other components of the system 100. For example, in some embodiments, the control panel comprises a fluid switch for turning on and off the pumps 138, 265 that pump wiper fluid to the wiper blades 120, 210. In some embodiments, the control panel comprises a window wiper switch for turning on and off the first motor 150. In some embodiments, the control panel comprises a mirror switch for turning on and off the second motor 250. In some embodiments, the control panel comprises a convex mirror control button for moving the convex mirror 104*a*.

The following the disclosures of the following U.S. patents are incorporated in their entirety by reference herein: U.S. Pat. No. 4,316,303; U.S. Pat. Application No. 2001/0049853; U.S. Pat. No. 7,069,617; U.S. Pat. No. 7,222,384; U.S. Pat. No. 5,150,497.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A window wiper system comprising:
   (a) a first wiper component for wiping a window of a side door of a vehicle, the first wiper component comprises:
      (i) a first wiper arm pivotally attached to the side door of the vehicle via pivot mechanism, wherein a first wiper blade is disposed on a second end of the first wiper arm, the first wiper blade is slidably in contact with the window;
      (ii) a first motor operatively connected to the first wiper arm, the first motor functions to cause the first wiper arm to oscillate in a first direction and a second direction about the pivot mechanism, whereby oscillation of the first wiper arm causes the first wiper blade to move back and forth across the window;
      (iii) a wiper fluid source comprising wiper fluid, the wiper fluid source is disposed in the side door, the wiper fluid source is fluidly connected to the first wiper blade via a wiper fluid tube, wherein the wiper fluid tube connects to an aperture disposed in the first wiper blade; and
      (iv) a fluid pump functioning to pump wiper fluid from the wiper fluid source through the wiper fluid tube to the aperture in the first wiper blade, the first wiper blade wipes the wiper fluid on the window; and
   (b) a side mirror component attachable to the side door of the vehicle via an attachment means, the side mirror component comprising:
      (i) a base having a top end, a bottom end, a front panel with mirrored surface, and an inner cavity;
      (ii) a first gear disposed on the front panel of the base, the first gear is positioned generally parallel to the front panel of the base, the first gear can rotate in a first direction and a second direction about an axle;
      (iii) a pivot arm attached to the first gear on the front panel of the base, wherein rotation of the first gear in the first direction translates to pivoting the pivot arm in a first direction and rotation of the first gear in the second direction translates to pivoting the pivot arm in a second direction;
      (iv) a second motor disposed in the inner cavity of the base, the second motor comprises a motor gear, the motor gear is operatively connected to the first gear, the second motor functions to cause the first gear to move in the first direction and the second direction;
      (v) a second wiper blade pivotally attached to the pivot arm, wherein the second wiper blade is slidably in contact with the mirrored surface on the front panel of the base, wherein a first end of the second wiper blade is positioned near the top end of the base, and wherein a second end of the second wiper blade is positioned near the bottom end of the base; wherein when the pivot arm is pivoted in the first direction the second wiper blade is moved in a first direction over the mirrored surface and when the pivot arm is pivoted in the second direction the second wiper blade is moved in a second direction over the mirrored surface,
   wherein the pivot arm is a pair of pivot arms comprising a left arm and a right arm;
   wherein the right arm is attached to the first gear and the left arm is attached to a second gear, the second being attached to the front panel of the base near the first gear, the second motor is operatively connected to both the first gear and the second gear and functions to move both the first gear and the second gear in the first direction and the second direction;
   wherein the second wiper blade is pivotally attached to both the left arm and the right arm;
   wherein the first gear and second gear rotates on a plane that is parallel to a plane that the second wiper blade sweeps on;
      (vi) a mirror wiper fluid source comprising wiper fluid, the mirror wiper fluid source is disposed in the inner cavity of the base, the mirror wiper fluid source is fluidly connected to the second wiper blade via a mirror wiper fluid tube, wherein the mirror wiper fluid tube connects to a mirror wiper fluid aperture disposed in the second wiper blade; and
      (vii) a mirror pump functioning to pump wiper fluid from the mirror wiper fluid source through the mirror wiper fluid tube to the second wiper blade, the second wiper blade wipes the wiper fluid on the mirrored surface.

2. The wiper system of claim 1, wherein the first motor or the fluid pump is operatively connected to a power source.

3. The wiper system of claim 2, wherein the power source is an electrical system of the vehicle.

4. The wiper system of claim 1 further comprising a convex mirror disposed on the front panel of the base near the bottom end.

5. A new window wiper system consisting of:
   (a) a first wiper component for wiping a window of a side door of a vehicle, the first wiper component comprises:
      (i) a first wiper arm pivotally attached to the side door of the vehicle via pivot mechanism wherein a first wiper blade is disposed on a second end of the first wiper arm, the first wiper blade is slidably in contact with the window;
      (ii) a first motor operatively connected to the first wiper arm, the first motor functions to cause the first wiper arm to oscillate in a first direction and a second direction about the pivot mechanism whereby oscillation of the first wiper arm causes the first wiper blade to move back and forth across the window;
      (iii) a wiper fluid source comprising wiper fluid, the wiper fluid source is disposed in the side door, the wiper fluid source is fluidly connected to the first wiper blade via a wiper fluid tube, wherein the wiper fluid tube connects to an aperture disposed in the first wiper blade; and
      (iv) a fluid pump functioning to pump wiper fluid from the wiper fluid source through the wiper fluid tube to the aperture in the first wiper blade, the first wiper blade wipes the wiper fluid on the window; and (b) a side mirror component attachable to the side door of the vehicle via an attachment means, the side mirror component comprising:
   (i) a base having a top end a bottom end, a front panel with a mirrored surface, and an inner cavity;
   (ii) a first gear disposed on the front panel of the base, the first gear is positioned generally parallel to the front panel of the base, the first gear can rotate in a first direction and a second direction about an axle;
   (iii) a pivot arm attached to the first gear on the front panel of the base, wherein rotation of the first gear in the first direction translates to pivoting the pivot arm in a first direction and rotation of the first gear in the second direction translates to pivoting the pivot arm in a second direction;
   (iv) a second motor disposed in the inner cavity of the base, the second motor comprises a motor gear, the motor gear is operatively connected to the first gear, the second motor functions to cause the first gear to move in the first direction and the second direction;
   (v) a second wiper blade pivotally attached to the pivot arm, wherein the second wiper blade is slidably in contact with the mirrored surface on the front panel of the base, wherein a first end of the second wiper blade is positioned near the top end of the base, and wherein a second end of the second wiper blade is positioned near the bottom end of the base; wherein when the pivot arm is pivoted in the first direction the second wiper blade is moved in a first direction over the mirrored surface and when the pivot arm is pivoted in the second direction the second wiper blade is moved in a second direction over the mirrored surface, wherein the pivot arm is a pair of pivot arms comprising a left arm and a right arm;

wherein the right arm is attached to the first gear and the left arm is attached to a second gear, the second being attached to the front panel of the base near the first gear, the second motor is operatively connected to both the first gear and the second gear and functions to move both the first gear and the second gear in the first direction and the second direction;

wherein the second wiper blade is pivotally attached to both the left arm and the right arm;

wherein the first gear and second gear rotates on a plane that is parallel to a plane that the second wiper blade sweeps on;

(vi) a mirror wiper fluid source comprising wiper fluid, the mirror wiper fluid source is disposed in the inner cavity of the base, the mirror wiper fluid source is fluidly connected to the second wiper blade via a mirror wiper fluid tube, wherein the mirror wiper fluid tube connects to a minor wiper fluid aperture disposed in the second wiper blade; and
   (vii) a mirror pump functioning to pump wiper fluid from the mirror wiper fluid source through the mirror wiper fluid tube to the second wiper blade, the second wiper blade wipes the wiper fluid on the mirrored surface.

* * * * *